Oct. 17, 1950 — D. SCHIFFBAUER — 2,525,833
BOBSLED
Filed Feb. 17, 1947 — 2 Sheets-Sheet 1

INVENTOR.
Daniel Schiffbauer.
BY Victor J. Evans & Co.
ATTORNEYS

Oct. 17, 1950 D. SCHIFFBAUER 2,525,833
BOBSLED
Filed Feb. 17, 1947 2 Sheets-Sheet 2
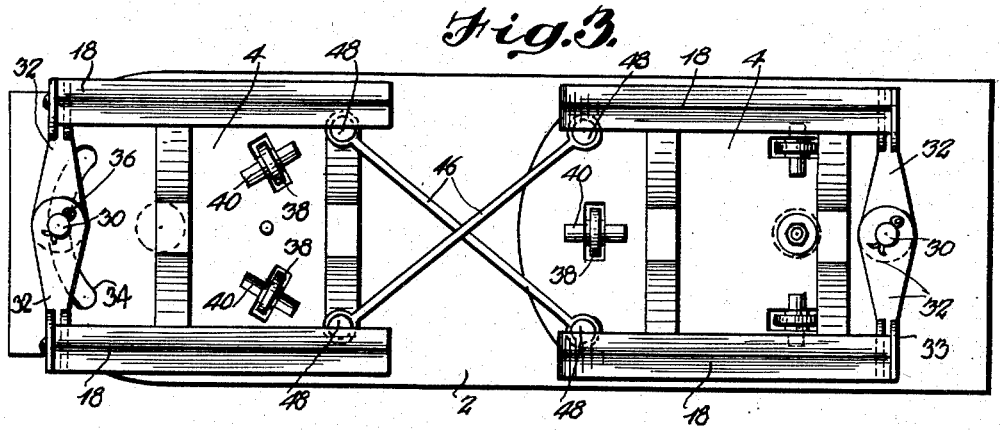
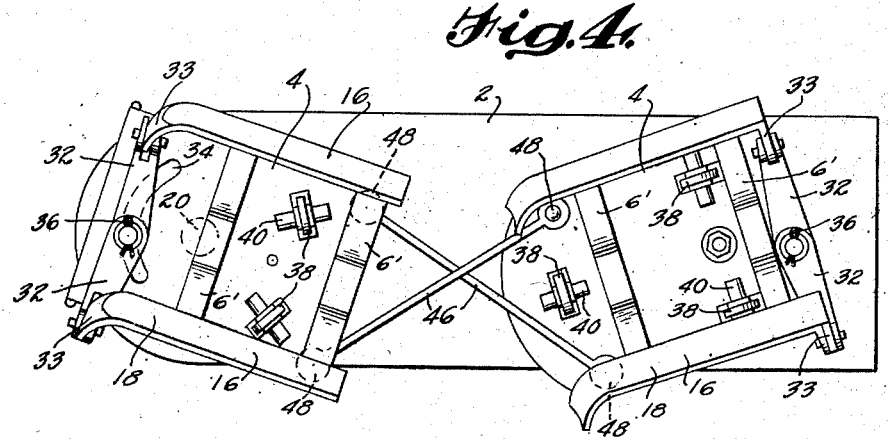
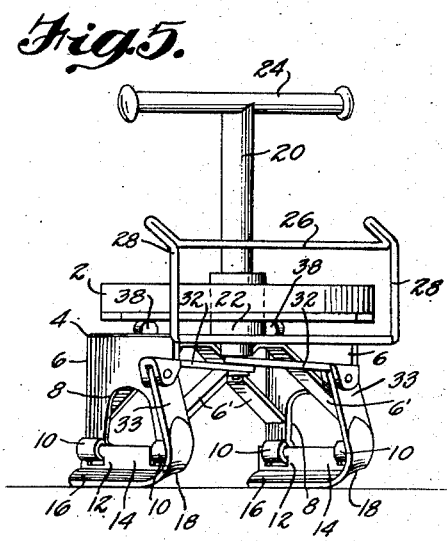
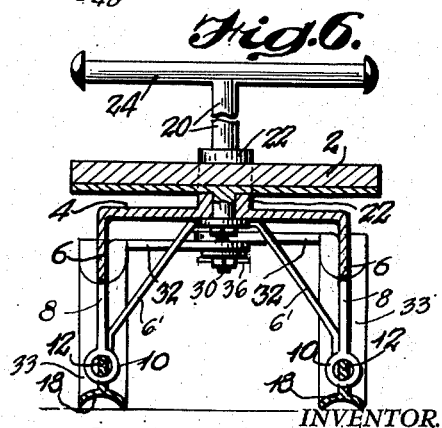
INVENTOR.
*Daniel Schiffbauer*
BY *Victor J. Evans & Co.*
ATTORNEYS Patented Oct. 17, 1950

2,525,833

UNITED STATES PATENT OFFICE 2,525,833

BOBSLED

Daniel Schiffbauer, Morgantown, W. Va.; Erma Miller, administratrix of said Daniel Schiffbauer, deceased, assignor to Howard Schiffbauer, Morgantown, W. Va.

Application February 17, 1947, Serial No. 728,999

2 Claims. (Cl. 280—16)

My present invention relates to an improved bob sled and more particularly to the articulation arrangement between the front and rear trucks to facilitate the steering and render more effective the operator's control in guiding the sled.

I also employ grooved runners for the trucks so that the sled may be steered and controllled even on hard packed snow or ice. Other features used in connection with the principal elements will be referred to hereinafter.

In the accompanying drawings I have illustrated one complete example of the physical embodiment of my invention according to the best mode I have thus far devised, but it will be understood that various changes and alterations may be made in the exemplified structure within the scope of the appended claims.

In the drawings:

Fig. 3 is a bottom plan view.

Fig. 4 is a similar view with the trucks pivoted as when steering to the left.

Fig. 5 is a perspective view of a portion of the front end of the sled of Fig. 1 with certain parts thereof omitted for purposes of clarity.

Figs. 6, 7 and 8 are transverse sectional views at the indicated lines of Fig. 2.

Figure 1:
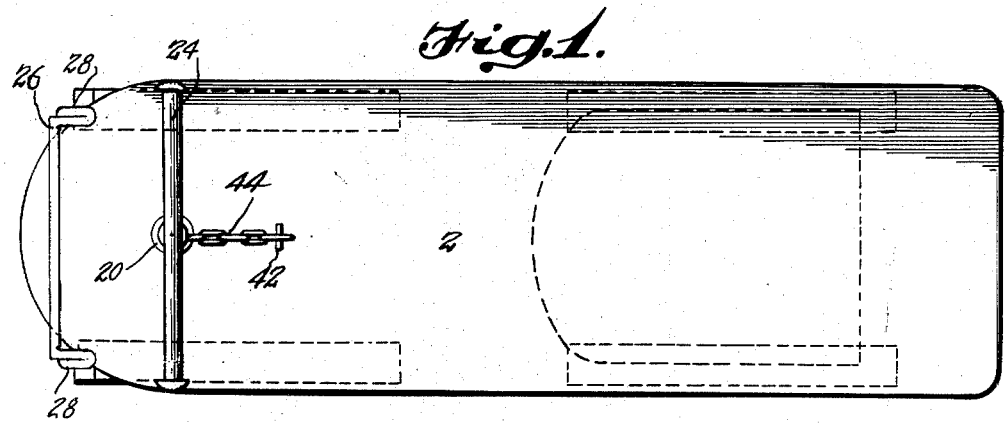
Fig. 1 is a top plan view of the bob sled of my invention.
Figure 2:
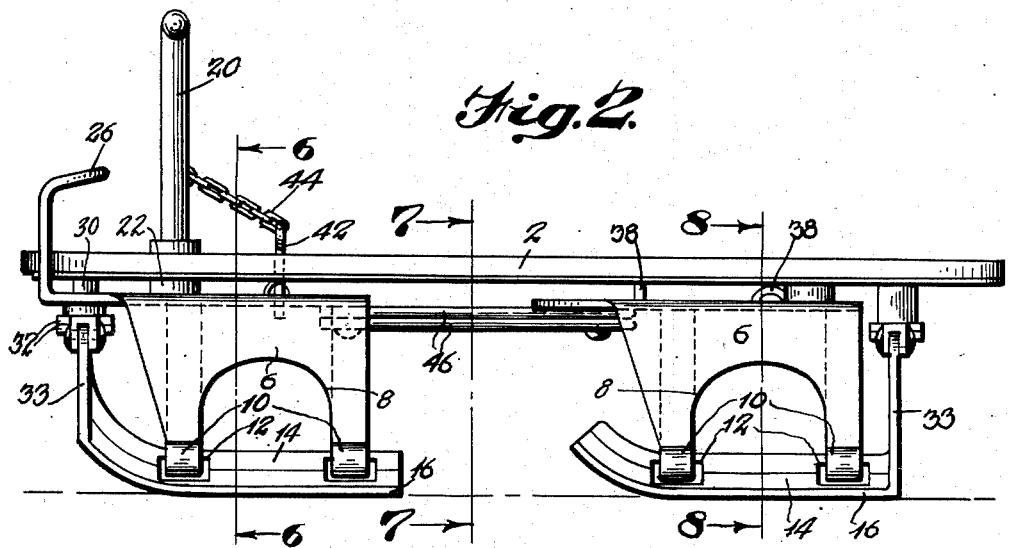
Fig. 2 is a side elevational view.
Figure 7:
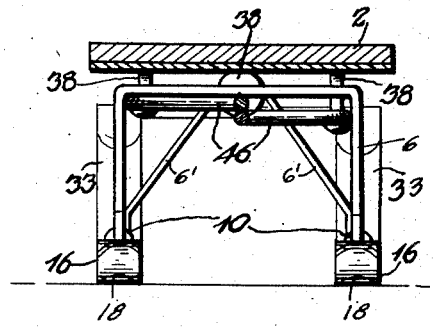
Figure 8:
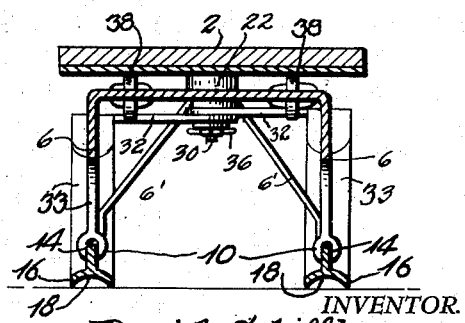

Referring now to the drawings, I have illustrated the present preferred embodiment of the bob sled of my invention as comprising the top board 2.

The board 2 is carried upon front and rear trucks each of which comprises a yoke with a base 4 having depending supports 6 which are bifurcated as at 8, in Figs. 5 and 6, into legs each of which is formed with a collar 10 rotatably receiving the bars 12 of the runners which have vertical straps or tongues 14 and runner bars 16 which are concaved at 18 to increase the control of the sled. The supports 6 are suitably reinforced by sloping elements 6'.

The front truck is pivoted to the board by shaft 20 on collars 22 and the handle 24 affords one means of turning the truck. In addition the foot bar 26 has arms 28 secured to the base 4 to assist in turning the truck. The base 4 of the runner yoke at the forward end of the sled is provided with an arcuate slot 34 which slidably receives a pin 30 extended downwardly from the under surface of the board 2 and the pin provides a pivot for a pair of links 32 which are retained on the pin by a cotter pin 36.

These links 32 are pivotally attached to the upturned ends 33 of the tongues 14. The runners 16 are rotatably held in the collars 10 and, therefore, each runner is tiltable about an axis extended through the collars 10, this axis being parallel to the longitudinal axis of each runner. The links 32 hold the upwardly extended ends 33 of the runners and as the lower parts of the runners are turned laterally about the pivot 20 the runners twist or rotate about the centers of the collars 10 whereby the steering mechanism is actuated, as seen in Fig. 5. Rollers 38 on shafts 40 journaled in the truck base ease the steering operation. The pin 42 secured to the shaft 20 by chain 44 may be inserted through the board and truck to lock the truck as when the sled is being pulled to the top of the grade.

The rear truck is similar to the front truck but in the rear I omit the steering mechanism and the arcuate slot 34 although the rear truck is pivotally attached to the board.

In order to effect rotation of both trucks I provide a pair of connecting bars 46 secured at 48 and which connect the opposite sides of the adjacent ends of the two trucks the bars crossing each other but having no connection with each other.

Thus as seen in Figs. 3 and 4 with the front truck manually rotated to the left the articulating bars will turn the rear truck in the opposite direction and the turning radius will be reduced and the steering control materially increased.

With the grooved runners 16 pivoting longitudinally on the collars 10, the tilting of the runners causes a longitudinal edge to be forced into the surface over which the runners move, thereby preventing sidewise slippage of the front truck and hence the steering mechanism will be more effective and the safety and pleasure in bob sledding will be greatly enhanced.

Having thus fully described my invention what I claim as new and desire to secure by Letters Patent is:

1. A bob sled comprising a top board and pivotally mounted front and rear trucks, manual steering means for the front truck, means connecting the front and rear trucks whereby a steering motion of the front truck will result in opposite motion of the rear truck, grooved runners pivotally supported from the trucks, and a pair of links connecting the pivoted runners and a stationary pin connecting the links, said links being movable about the pin upon actuation of the steering mechanism to longitudinally rotate the runners to bring the inside edge thereof into cutting relation with the ground.

2. A bob sled comprising a top board and pivotally mounted front and rear trucks, manual steering means for the front truck, means connecting the front and rear trucks whereby a steering motion of the front truck will result in opposite motion of the rear truck, grooved runners pivotally supported from the trucks, and a pair of links connecting the pivoted runners and a stationary pin through an arcuate slot in the truck connecting the links, said links being movable about the pin upon actuation of the steering mechanism to longitudinally rotate the runners to bring the inside edge thereof into cutting relation with the ground.

DANIEL SCHIFFBAUER.

REFERENCES CITED

The following references are of record in the file of this patent:

UNITED STATES PATENTS

| Number | Name | Date |
| --- | --- | --- |
| 1,242,514 | Bourdon | Oct. 9, 1917 |

FOREIGN PATENTS

| Number | Country | Date |
| --- | --- | --- |
| 64,503 | Austria | Apr. 25, 1914 |
| 206,002 | Germany | Jan. 22, 1909 |
| 210,261 | Germany | May 25, 1909 |
| 231,081 | Germany | Feb. 14, 1911 |